United States Patent [19]
Ori

[11] Patent Number: 4,971,421
[45] Date of Patent: Nov. 20, 1990

[54] FIBER OPTIC SPLICE AND PATCH ENCLOSURE

[75] Inventor: Peter C. Ori, Chicago, Ill.

[73] Assignee: Reliance Comm/Tec Corporation, Cleveland, Ohio

[21] Appl. No.: 414,715

[22] Filed: Sep. 29, 1989

[51] Int. Cl.$^5$ .......................... G02B 6/26; B65D 85/38
[52] U.S. Cl. ............................... 350/96.20; 350/96.21; 350/96.22; 206/316.1; 206/558; 206/560
[58] Field of Search ............... 350/96.10, 96.20, 96.21, 350/96.22; 439/719; 361/428, 429; 206/316.1, 558, 560

[56] References Cited

U.S. PATENT DOCUMENTS

| | | | |
|---|---|---|---|
| 4,266,853 | 5/1981 | Hutchins et al. | 350/96.20 |
| 4,418,982 | 12/1983 | Williams | 350/96.20 |
| 4,585,303 | 4/1986 | Pinsard et al. | 350/96.20 |
| 4,673,246 | 6/1987 | Schembri | 350/96.22 |
| 4,699,455 | 10/1987 | Erbe et al. | 350/96.20 |
| 4,754,876 | 7/1988 | Noon et al. | 206/334 |
| 4,792,203 | 12/1988 | Nelson et al. | 350/96.20 |
| 4,818,054 | 4/1989 | George et al. | 350/96.20 |
| 4,824,196 | 4/1989 | Bylander | 350/96.20 |
| 4,840,449 | 6/1989 | Ghandeharizadeh | 350/96.20 |
| 4,886,336 | 12/1989 | Deusser et al. | 350/96.20 |
| 4,911,662 | 3/1990 | Debortoli et al. | 439/719 |

Primary Examiner—Brian Healy
Attorney, Agent, or Firm—R. A. Blackstone, Jr.

[57] ABSTRACT

A communication cable enclosure having a generally hollow housing, a splice area for splicing and containing cables and a patch area having multiple connectors attached to a patch panel. The multiple connectors attach to the cables at one end and are mounted to the patch panel at another end for interconnecting the cables using patch cables having matingly connectorized ends. The splice area and patch area are positioned on a generally planar top of a common shelf which has at least two side portions. The shelf is slidably retained generally parallelly co-planar the planar top. The shelf and hollow housing have locking pieces for retaining the shelf in predetermined positions along a path which it slidably travels into and out of the hollow body. The locking pieces include a locking protuberance retained on a spring portion which is fixedly retained on the hollow housing, the locking protuberance biasedly projects through a protuberance aperture formed through a side of the hollow body portion for engaging another aperture formed in the side portions of the shelf.

11 Claims, 3 Drawing Sheets

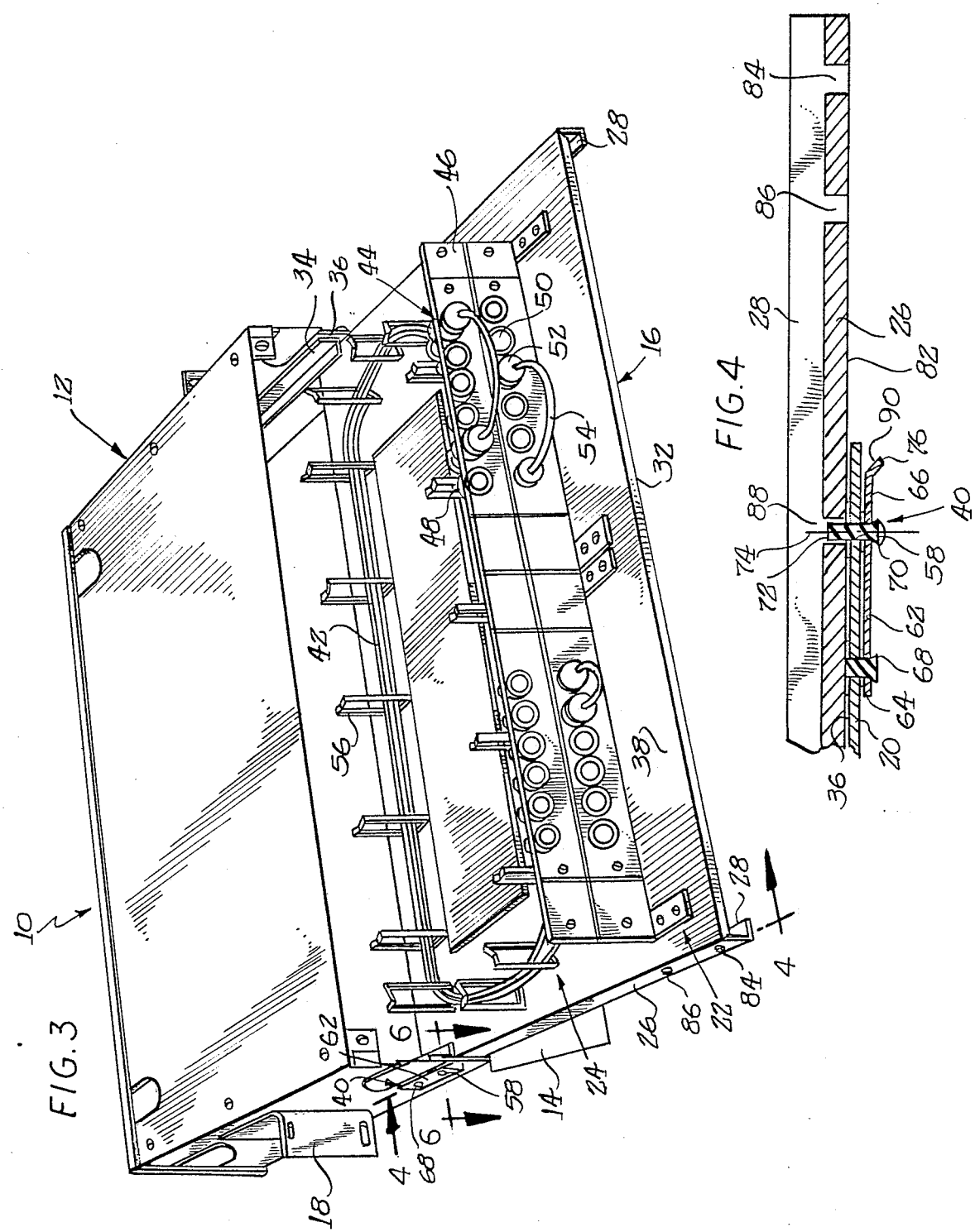

FIBER OPTIC SPLICE AND PATCH ENCLOSURE

BACKGROUND OF THE INVENTION

This invention relates to a communication cable enclosure having a slidable shelf retained therein which can be locked in one of several positions.

Currently, fiber optic cables are in wide use in telecommunications and datacommunications because of the high volume and high rate at which data which can be transmitted over such cables. Many systems previously using conventional electrically conductive cabling have been or are being converted to fiber optic cables. Increased use of fiber optic cables has presented new problems requiring new solutions to be devised to accommodate the characteristics of fiber optic cables.

For example, one problem encountered in using fiber optic cables is that this type of cable cannot be bent beyond a specified minimum radius. Over bending of fiber optic cables interferes with the propogation of light within the cable thereby impairing the data transmission capabilities of the cable. Another problem encountered using fiber optic cables is that this type of cable has special splicing requirements when joining two pieces of cable to assure continued propogation of light transmitted through the joined area or interface between cables. Additionally, as with other data transmission mediums, when the need arises to patch one cable to another cable, it is desirable to permit such changes to the patched circuit quickly and easily.

In response to the problems and needs of fiber optic cable, special equipment such as a splice and patch enclosure have been created. The splice and patch enclosure provides an area in which the cable is spliced and an area in which the spliced cables can be interconnected or "patched". The splicing area provides fiber guide rings in which excess cable can be stored and are spaced to maintain greater than the specified minimum bend radius in the cables stored therein. The splice area also provides secure retaining structures to retain spliced cables relative one another to prevent movement of the cables which could damage or separate a splice joint. Cables retained within the splice area are connected to connectors mounted in a patch panel permitting the cables to be patched as needed.

In one prior art embodiment of a splice and patch enclosure, the splice area is contained within an enclosure having a flip-up door hingedly attached thereto to cover the enclosure. The patch area is typically mounted on the inside of the cover such that when the cover is opened, the patch area is exposed. A disadvantage of this design is that the cover does not offer easy access to the splice area.

Another prior art embodiment of a splice and patch enclosure positioned the splice area and the patch area on a common shelf which is removably mounted within the enclosure. This embodiment has a problem in that in order to work on the splice area or the patch area the entire shelf must be removed. If the shelf is not removed, one working on the splice and patch areas has the problem of the shelf moving relative to the enclosure when trying to create or disassemble a splice or trying to connect or disconnect a patch cable. This problem is further exacerbated by the fact that in a typical equipment room where such an enclosure is rack mounted, a surface on which to work on the removed shelf is not always available or conveniently located.

OBJECTS AND SUMMARY OF THE INVENTION

It is an object of the present invention to provide a communication cable enclosure which permits a shelf on which a patch area and a splice area are located, to be slidably moved into and out of the enclosure and to be locked in a number of intermediate positions for convenient and efficient operation within the splice and patch areas.

Another object of this invention is to provide a communication cable enclosure which has convenient and easy to use locking means to lock the slidable shelf in one of several positions.

It is a more specific object of this invention to provide a communication cable enclosure with a slidable shelf which can be locked in specified positions to provide efficient access to the patch area, the splice area and which can lock the shelf in a completely concealed position within the enclosure or disengage to permit the shelf to be removed from the enclosure.

Briefly, and in accordance with the foregoing, the present invention comprises a communication cable enclosure which has a slidably retained shelf having a splice area and a patch area positioned thereon. The enclosure has mounted on the sides thereof locking means which releasably retain the shelf in one of several specified positions. The locking means include a locking protuberance which is biasedly mounted to the enclosure and which protrudes through a protuberance aperture formed in a side of the enclosure body to engage a protuberance receiving aperture formed through a side of the shelf. The specific positions in which the shelf is releasably retained generally correspond to positions which provide access to the splice and/or patch areas.

BRIEF DESCRIPTION OF THE DRAWINGS

The organization and manner of operation of the invention, together with the further objects and advantages thereof, may best be understood by reference to the following description taken in connection with the accompanying drawings in which like reference numerals identify like elements and in which:

FIG. 3 is a perspective view of the splice and patch enclosure in which the shelf has been extracted from the enclosure and locked in a position revealing both the patch area and a splice area;

FIG. 4 is a partial cross-sectional view taken along the line 4—4 in FIG. 3 illustrating locking means used to secure the shelf in each of several specified positions;

DETAILED DESCRIPTION OF THE ILLUSTRATED EMBODIMENT

Figure 1:
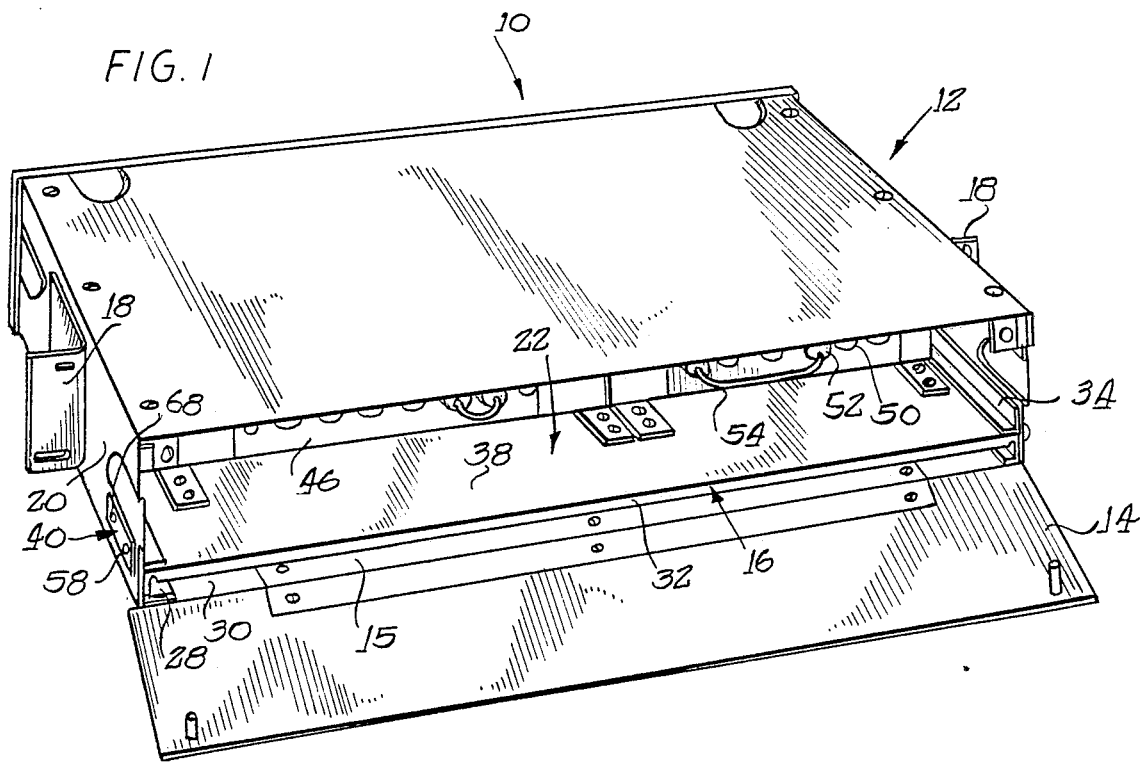
FIG. 1 is a perspective view of a splice and patch enclosure in which a front panel is opened and a shelf is locked in a concealed position.

While this invention is susceptible to embodiment in many different forms, there is shown in the drawings and will be herein described in detail one specific embodiment with the understanding that the present disclosure is to be considered an exemplification of the principles of the invention, and is not intended to limit the invention to the embodiment illustrated.

It should be noted that dimensional relationships between members of the illustrated embodiment may vary in practice or may have been varied in the illustrations to emphasize certain features of the invention.

A communication cable splice and patch enclosure 10 is illustrated in the perspective view of FIG. 1. As shown from the front of the enclosure 10, the enclosure has a generally hollow body portion or housing 12 to which is hingedly attached (at hinge 15) a front panel 14 which is illustrated in an open position. With the front panel 14 open, a shelf 16 is shown to be disposed within the body portion 12. The enclosure as shown in FIG. 1 is dimensioned to mount within a standardized equipment rack and to be secured by a pair of rack mounting flanges 18 mounted to side portions 20 of the housing 12. While the enclosure 10 is generally shown to be rectangularly shaped, the enclosure 10 and its components may be configured to any desired shape within the scope of the present invention.

Figure 2:
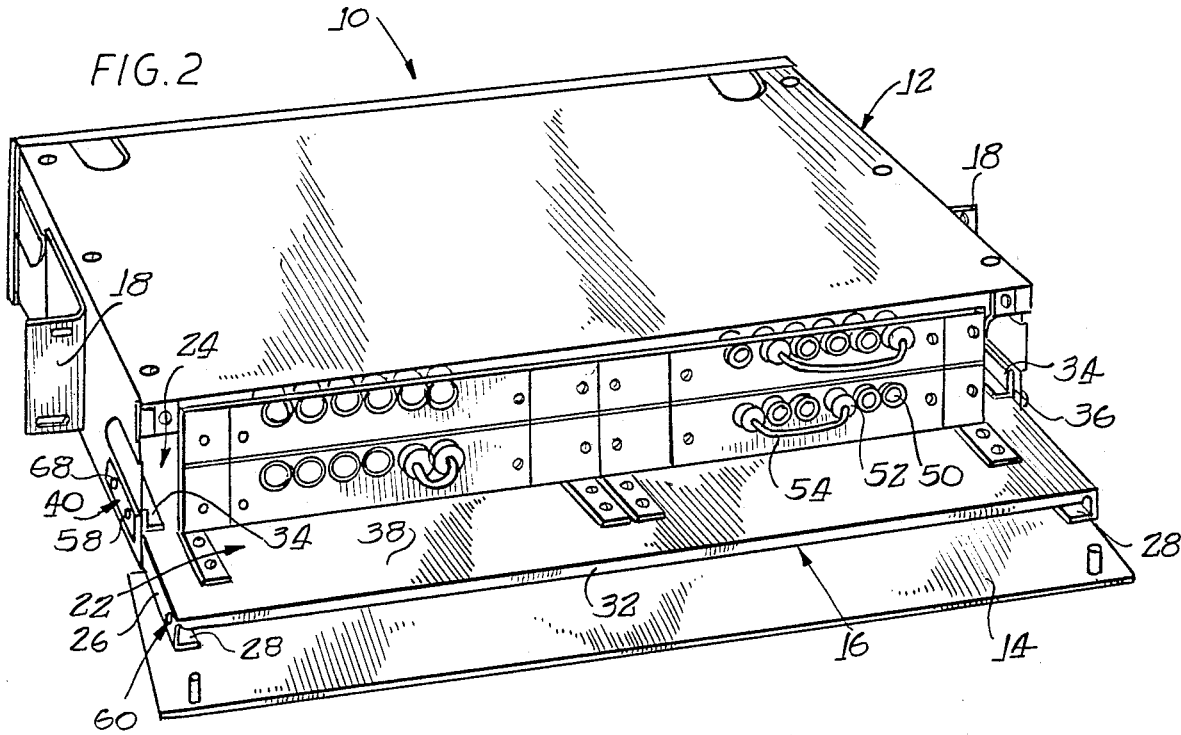
FIG. 2 is a perspective view of the splice and patch enclosure as illustrated in FIG. 1 in which the shelf has been extracted from the enclosure and locked in a position revealing a patch area.

In FIG. 2, the shelf 16 has been partially slidably extracted from the housing 12 to reveal a patch area 22 located on a front portion of the shelf 16. The configuration and function of the patch area 22 as well as that of a splice area 24 located behind the patch area 22 will be described in further detail hereinbelow.

The shelf 16 is formed with side portions 26 which are generally perpendicularly downwardly formed from the shelf. The side portions 26 are formed along opposed edges of the shelf and are of a dimension generally slightly smaller than an inside dimension of the body portion 12. The illustrated embodiment shows further bottom edges 28 formed generally inwardly of the side portions 26. Slidable movement of the shelf is generally supported by the bottom edge 28 slidably moving over an inside surface 30 of the bottom of the body portion 12 (shown in greater detail in FIG. 6).

Once the front panel 14 is opened, the shelf 16 can be extracted from the body 12 by gripping a front edge 32 of the shelf 16 and pulling the shelf 16 outwardly. The shelf 16 is retained in a generally planar orientation as it is extracted from body 12 by a restraining flange 34 mounted to the inside face 36 of the body 12 and extending over a portion of a planar top 38 of the shelf 16.

The shelf restraining flange 34 extends generally from the front to the rear of the housing 12 thereby providing planar retention of the shelf 16 when extracted from the housing 12. When the shelf 16 is extracted from the housing 12, it may be locked in one of several positions by cooperating complementary interengagable and releasable locking means 40 mounted to the housing 12 and shelf. The locking means 40 will be described in further detail hereinbelow.

Turning now to the perspective view of the enclosure 10 as illustrated in FIG. 3, the shelf 16 has been slidably extended from the body 12 to reveal both the patch area 22 and the splice area 24. The splice area 24 and patch area 22 are oriented to provide convenient access to cables 42 and connectors 44, respectively, retained therein.

As shown in FIG. 3, the patch area 22 is oriented generally perpendicular the top 38 of the shelf 16. While a perpendicular orientation is illustrated, it should be obvious that other orientations, as well as other configurations of the patch area, may be utilized within the scope of the present invention. The general objective of the patch area 22 is to present connectors 44 mounted to a patch panel 46 in a convenient easy-to-access orientation.

The connectors 44 mounted to the patch panel 46 in the patch area 22 have a cabled end 48 and a accessible end 50. The cabled .and is attached to an end of one of the cables 42 coiled in the splice area 24. The accessible end 50 is available to mate with a complimentary end 52 of a patch cable 54 which is utilized to interconnect cables 42.

The splice area 24 provides cable guides 56 in which the cables 42 are retained in a neatly coiled fashion while maintaining a sufficient turn radius 58 in the cable to prevent damage which could otherwise be caused by kinking or over-bending. While the splice area 24 as shown in FIG. 3 illustrates the cables 42 in a generally flat coiled orientation, the cable orientation can be adjusted to accommodate various enclosure or cable criteria. In FIG. 3, the cables 42 have been oriented as illustrated to provide a more compact yet convenient enclosure 10. It should also be noted that additional areas may be added to an enclosure in combination with the splice area 24 and patch area 22, without departing from the invention.

As noted above, the enclosure 10 is provided with locking means 40 which retains the shelf 16 in one of three locking positions or can be disengaged to remove the shelf from the body 12. FIG. 4 illustrates in greater detail the locking means 40 of the present invention. Generally, the locking means 40 functions by engaging a locking protuberance 58, biasedly retained on a side of the body 12, with a generally conforming protuberance receiving means 60 formed on the side portion 26 of the shelf 16. As illustrated, biasing means 62 is formed with a first end 64 and a second end 66. The first end 64 is securely retained to the side 20 of the hollow body 12 by a retaining fastener 68 such as a screw or rivet. The locking protuberance 58 is securely retained on the second end 66 of the biasing means 62 and projects through a protuberance aperture 70 formed through the side of the hollow body 20 to permit cooperative passage of the locking protuberance 58 therethrough.

Thus retained and positioned on the body 12, the locking means further includes the protuberance receiving means 60, formed on the side 26 of the shelf 16, which engages an end 72 of the locking protuberance 58 to lock the shelf 16 in a desired position. The protuberance receiving means 60 is shown in FIG. 5 as a series of apertures 84, 6, 88 formed through the side 26 of the shelf 16, however, the protuberance receiving means 60 may also take the shape of a depression which is cooperatively formed in the side 26 to receive the end 72 of the protuberance 58.

The protuberance aperture 70 and protuberance receiving means 60 are formed with dimensions slightly larger than a cross-section of the locking protuberance 58 to permit easy passage of the protuberance 58 therethrough. When engaged, the protuberance 58, protuberance aperture 70 and protuberance receiving means 60 have a generally co-incident central axis 74. The biasing means 62 has a releasing flange 76 formed on the tip of the second end 66 for providing an area in which to grip when disengaging the locking protuberance 58 from the protuberance aperture 70 and protuberance receiving means 60.

Figure 6:
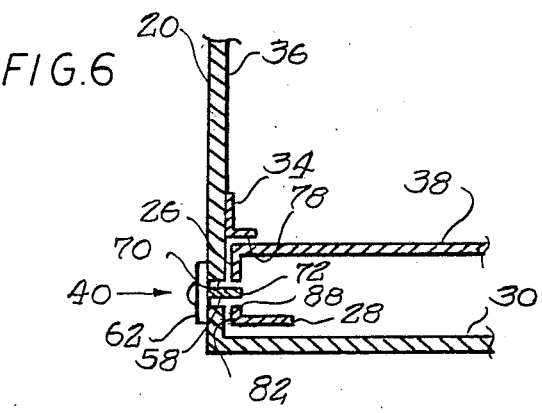
FIG. 6 is a partial cross-sectional view taken along line 6—6 as illustrated in FIG. 3 showing a locking protuberance engaged within one of the protuberance receiving means.

A cross-section taken along the line 6—6 as illustrated in FIG. 3 shows another view of the locking means 40. As shown in FIG. 6, the shelf 16 is slidably retained between a bottom face 78 of the shelf restraining flange 34 and the bottom surface 30 of the body 12. The shelf 16 is horizontally retained between the inside surfaces 36 of the body sides 20 and the outside faces 82 of the side portions 26. The locking protuberance 58 retained on the biasing means 62 is engaged in the protuberance aperture 70 and protuberance receiving aperture 88 thereby locking the shelf in a selected position.

Figure 5:
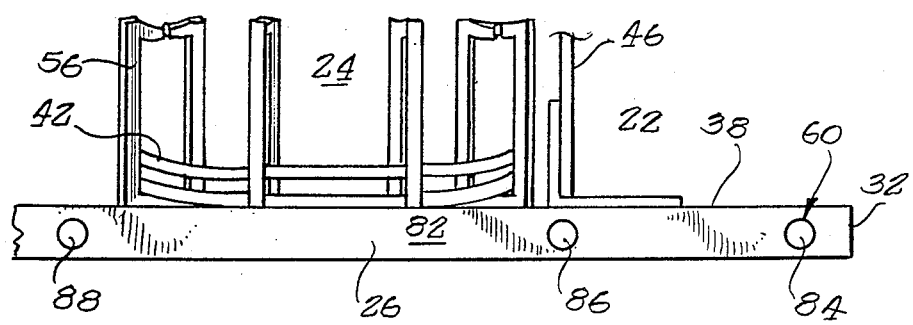
FIG. 5 is a partial side view of the shelf illustrating the position of protuberance receiving means of the locking means along a side of the shelf.

With reference to FIG. 4 and FIG. 5, the shelf 16 as shown in the illustrated embodiment is formed with three apertures 84, 86, 88 comprising the protuberance receiving means 60 formed on the side 26 of the shelf 16. Each of the protuberance receiving means 60 has been formed in a location which locks the shelf 16 in one of three positions and as such each protuberance receiving means 60 may be described with reference to a term describing the corresponding shelf position. The protuberance receiving means 60 located closest the front edge 32 of the shelf 16 is identified as the concealed position aperture or concealed aperture 84, the protuberance receiving means 60 positioned directly below the patch panel 46 is identified as the patch position aperture or patch aperture 86, and the protuberance receiving means 60 formed distal the front edge 32 of the shelf 16 is identified as the splice position aperture or splice aperture 88. Similar locking means structures may be provided on the opposite side of the enclosure 10, if desired.

In use, with reference to FIG. 1, the front panel 14 of the enclosure 10 is opened away from the body 12 to provide access to extract the shelf 16 concealed therein. In order to extract the shelf 16 from the body 12, the locking protuberance 58, on each side of the enclosure, must be disengaged from the respective concealed aperture 84. A user places a finger against an inside edge 90 of the releasing flange 76 formed on the second end 66 of the biasing means 62 and forces the generally flexible biasing means, to which the locking protuberance 58 is attached, away from the body side 20. Forcing the biasing means 62 away from the body side 20 disengages the locking protuberance 58 from the concealing aperture 84. Once the locking protuberance 58 is disengaged from the concealing aperture 84 on each side 26 of the shelf 16. The front edge 32 of the shelf 16 can be gripped to extract the shelf from the body 12.

Once the locking means 40 is disengaged to permit the shelf 16 to be extracted from the body 12, the end 72 of the locking protuberance 58 will slide along the outside face 82 of the side 26 of the shelf 16 until the next protuberance receiving means 60 is encountered, whereupon the biasing means 62 will tend to force the locking protuberance 58 therethrough. To lock the shelf 16 in position to expose only the patch area 22, the shelf is extracted until the locking protuberance 58 biasedly engages the patch aperture 86.

To position the shelf 16 in a position to access to splice area 24, the locking means 40 disengaging procedure described hereinabove is repeated to disengage the locking protuberance 58 from the patch aperture 86 and the shelf 16 is further extracted from the body 12 until the locking protuberance 58 engages the splice aperture 88. When the shelf 16 is locked in position to expose the patch area 22 and the splice area 24, operations may be carried out on either one of these areas, respectively, without the shelf sliding into or out of the cabinet. Further, when locked in position, the shelf 16 provides a stable, generally level, fixed position work platform obviating the need to remove the shelf, in most instances, while working in the splice and patch areas. If desired, however, release of the protuberance 58 from aperture 86 may be expected to permit removal of the entire shelf 16 from the housing 12.

While a particular embodiment of the present invention has been shown and described in detail herein, it will be obvious to those skilled in the art that changes and modifications of the present invention, in its various aspects, may be made without departing from the invention in its broader aspects, some of which changes and modifications being matters of routine engineering or design, and others being apparent after study. As such, the scope of the invention should not be limited by the particular embodiment and specific construction described herein, but should be defined in the appended claims and equivalents thereof. Accordingly, the aim of the appended claims is to cover all such changes and modifications as fall within the true spirit and scope of the invention.

I claim:

1. A communication cable enclosure comprising: a generally hollow housing; a splice area defined in said housing for splicing and containing cables; a patch area defined in said housing and having a plurality of connectors positioned therein; said connectors being attached to said cables at one end and having an accessible end for interconnecting said cables using patch cables having complementary connectorized ends; said splice area and said patch area being positioned on a common shelf having a generally planar top on which said splice area and said patch area are located, said shelf having at least two opposed side portions generally perpendicularly attached to said planar top, said shelf being slidably retained within said housing; said shelf and said housing having complementary interengagable and releasable locking means for retaining said shelf in a plurality of predetermined positions along a path which said shelf slidably travels.

2. A communication cable enclosure according to claim 1 wherein said splice area is positioned co-planar said planar top for permitting coiling of said cable in a flat orientation while maintaining generally large turn radiuses in said cable when coiled and maintaining a generally low profile of said generally hollow housing into which said shelf slides.

3. A communication cable enclosure according to claim 1 wherein a patch panel to which said plurality of connectors are mounted is positioned in said patch area, said patch panel being positioned generally perpendicular said planar top of said shelf and such that it is exposed exteriorly of said housing when said shelf is in at least one of said predetermined positions for permitting ease of access in connecting said cables positioned in said splice area to the connectors mounted to said patch panel and for connecting said patch cables between said connectors.

4. A communication cable enclosure according to claim 1 wherein said locking means comprise a protuberance receiving means formed on a portion of one of said at least two opposed side portions; a locking protuberance mounted to sidewall portion of said housing and a protuberance aperture formed through a side of said housing through which said protuberance projects for engaging said protuberance receiving means; and biasing means for releasably biasing said locking protuberance through said protuberance aperture and into said protuberance receiving means when said shelf is positioned along said path within said hollow so as to align said protuberance receiving means with said protuberance aperture.

5. A communication cable enclosure according to claim 4 wherein said locking protuberance comprises a shaft having a longitudinal axis extending generally coaxially with a central axis extending through the center of said protuberance aperture, and also with a central axis of said protuberance receiving means, when the latter is in registry with the aperture.

6. A communication cable enclosure according to claim 4 wherein said biasing means comprises a strip of flexible spring steel type material having a first end fixedly attached to an outer side surface of said housing and a second end attached to said locking protuberance said locking protuberance being disengagable from said protuberance receiving means by forcibly separating said second end of said biasing means from said side of said housing.

7. A communication cable enclosure according to claim 4 wherein said protuberance receiving means comprises an aperture formed through said side portion of said shelf, said aperture having dimensions generally larger than a cross-section of said locking protuberance for permitting passage of said locking protuberance when biasedly inserted therein or disengagably removed therefrom.

8. A communication cable enclosure having a generally hollow housing and a splice area for splicing and containing cables and a patch area having multiple connectors attached to a patch panel retained therein; said multiple connectors attaching to said cables at one end and having an accessible end for interconnecting said cables using patch cables having matingly complementary connectorized ends; said splice area and said patch area being positioned on a generally planar top of a common shelf, said shelf having at least two opposed side portions attached to said planar top, said shelf being slidably concealable in said hollow housing and slidably retained generally parallelly co-planar said planar top when extracted from said hollow housing; said shelf and hollow housing having complementary interengagable and releasable locking means for releasably retaining said shelf in a plurality of predetermined positions along a path which said shelf slidably travels into and out of said hollow housing; said locking means comprising a locking protuberance retained on biasing means, said biasing means fixedly retained on said hollow housing, said locking protuberance biasedly projecting through a protuberance aperture formed through a side of said hollow housing for engaging a generally conforming protuberance receiving means formed on a corresponding portion of at least one of said at least two opposed side portions.

9. A communication cable enclosure according to claim 8 wherein said enclosure has at least a pair of locking means with at least one of said locking means positioned on each of at least two opposed sides of said hollow housing, said locking protuberance of each of said at least two locking means engagable with at least two corresponding protuberance receiving apertures formed through each of said side portions of said shelf at spaced apart locations.

10. A communication cable enclosure according to claim 9 wherein said side portion have more than two protrusion receiving apertures formed therethrough and said spaced apart locations generally correspond to a closed position for disengagably lockingly retaining said shelf within said hollow housing, a patch position for disengagably lockingly retaining said shelf in a position for convenient operation within said patch area, and a splice position for disengagably lockingly retaining said shelf in a position for convenient operation within said splice area.

11. A communication cable enclosure according to claim 9 wherein said shelf is completely removable from said hollow housing.

* * * * *